United States Patent [19]
Brown

[11] Patent Number: 5,407,296
[45] Date of Patent: Apr. 18, 1995

[54] ONE PIECE SHAFT CLAMP

[75] Inventor: Christopher K. Brown, Camp Hill, Pa.

[73] Assignee: The Whitaker Corporation, Wilmington, Del.

[21] Appl. No.: 59,429

[22] Filed: May 7, 1993

[51] Int. Cl.⁶ .................................................. B25G 3/00
[52] U.S. Cl. ...................... 403/383; 403/371; 403/367; 403/365
[58] Field of Search ............... 403/371, 368, 367, 365, 403/383

[56] References Cited

U.S. PATENT DOCUMENTS

| | | | |
|---|---|---|---|
| 2,736,205 | 2/1956 | Dunne | 403/371 |
| 3,596,943 | 8/1971 | Krauss | 403/371 |
| 4,294,562 | 10/1981 | Müllenberg | 403/383 |
| 4,434,883 | 3/1984 | Raines | 403/371 |
| 4,923,326 | 5/1990 | Fietzke | 403/371 |
| 5,174,680 | 12/1992 | Nakamura et al. | 403/371 |

FOREIGN PATENT DOCUMENTS 0269723  10/1989  Japan .................................. 403/368

OTHER PUBLICATIONS

Wood's Catalog No. 1M, pp. 1M-1 through 1M-8, Wood's Sure-Grip QD bushings, Jul. 1983.

*Primary Examiner*—Richard A. Berisch
*Assistant Examiner*—William J. Wicker

[57] ABSTRACT

A one piece shaft clamp is disclosed having a flange and a tapered shank. The shaft clamp has a central bore that conforms in size and shape to the cress-sectional shape of a shaft. Relatively thin cuts are formed in the clamp through the shank and partially through the flange to form segments. Additional cuts are made in the flange adjacent the thin cuts to form relatively thin beams that resiliently interconnect the segments. The one piece shaft clamp is used in conjunction with a member that is to be secured to the shaft. The member has a tapered bore that mates with the tapered shank of the clamp so that when the shank is forced into the bore, the segments are urged into locking engagement with the shaft.

14 Claims, 4 Drawing Sheets

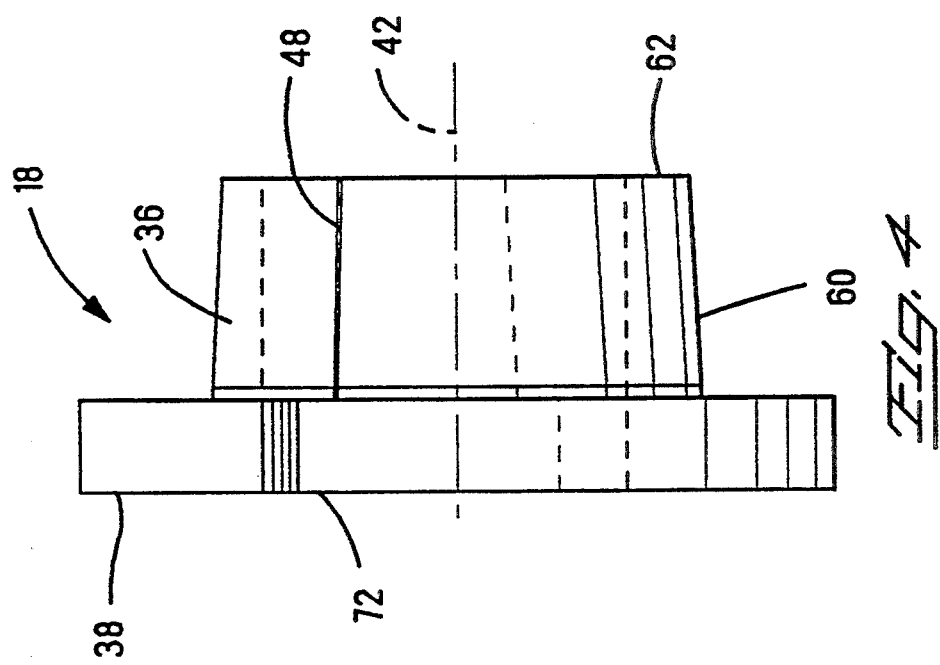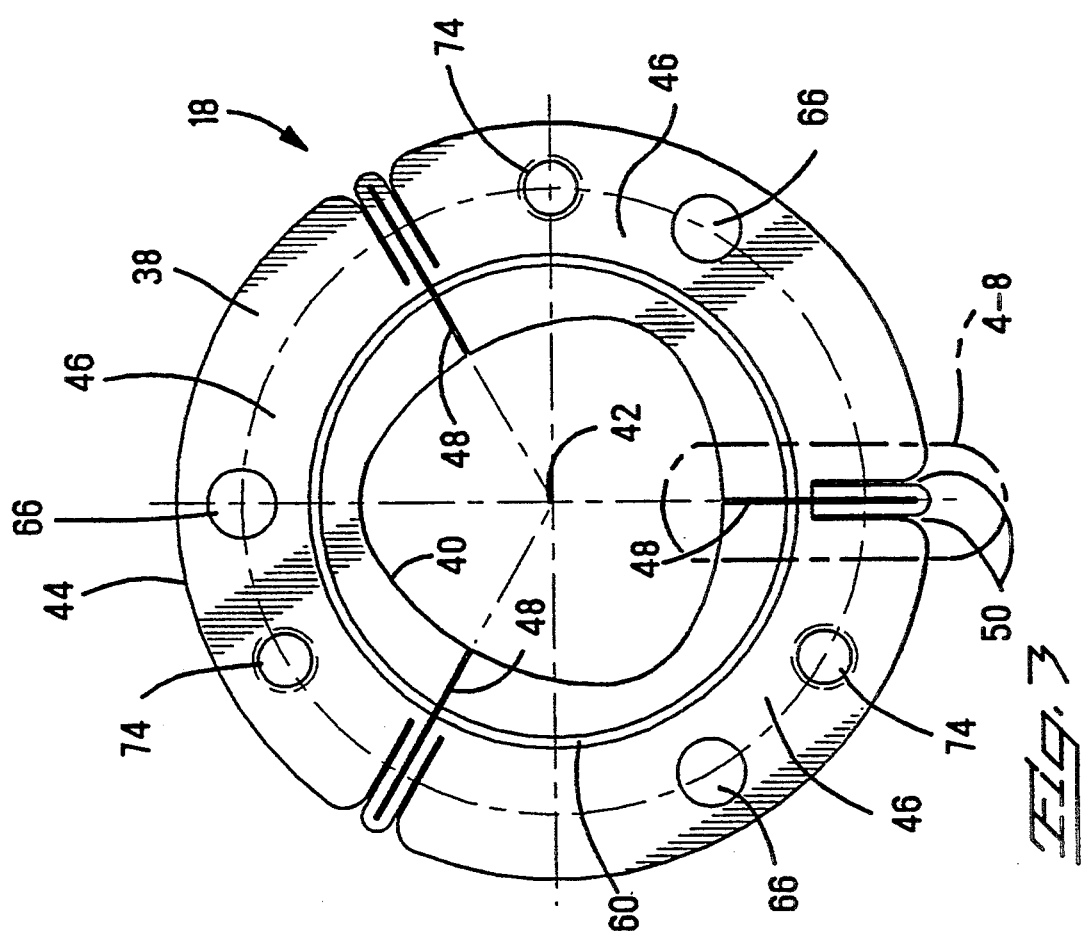

ONE PIECE SHAFT CLAMP

The present invention relates to a clamp for releasably securing a member to a shaft for rotation therewith. The shaft clamp is of unitary construction and of the type having multiple segments that cooperate with the member to engage the shaft and lock the clamp and member assembly to the shaft.

BACKGROUND OF THE INVENTION

It is common practice in the machinery art to attach pulleys and similar parts to circular drive shafts by means of commercially available tapered bushings that are split through one side of the flange and taper. The pulley includes a bore having a matching taper so that the tapered shank of the bushing may be forced into the tapered bore of the pulley, by means of screws, causing the bushing to clamp onto the circular shaft, thereby securing the bushing and pulley assembly to the shaft for rotation therewith. There is usually a keyway and mating key to positively couple the bushing to the shaft. While this arrangement provides a one piece clamp that works well with shafts having circular cross sections, it is difficult to apply to shafts having non-circular cross sections. Take, for example, a shaft having a three lobe polygon cross section. In order to utilize the conventional tapered bushing, the entire bushing would have to be split into three segments, one segment for each of the three lobes of the shaft. While this might be functional, it would be difficult to position and assemble the three separate segments thereby increasing the cost to manufacture the machine. Additionally, with the three separate segments, there is an increased chance that one or more of the segments would be forced into the bore of the pulley too far causing the parts to not be concentric and perhaps causing unbalanced stresses. This problem is magnified with shafts having more complex cross sections requiring more than three segments. What is needed is a one piece shaft clamp that may be utilized with shafts of both circular and non-circular cross section.

SUMMARY OF THE INVENTION

A shaft clamp of unitary construction is disclosed for securing a member to a shaft for rotation therewith. The clamp has a shank, a flange, and a central bore formed along its axis. The bore closely conforms to the outer circumference of the shaft in both size and shape. The shank has an outer surface that tapers from a larger dimension near the flange to a smaller dimension away from the flange. The flange includes a peripheral surface that is larger than the larger dimension of the shank. The clamp is formed in at least two segments that are interconnected only by a portion of the flange. The member has an inner surface that tapers in conformance to and mates with the tapered outer surface of the shank. Means is included for urging the two tapered-surfaces into engagement so that the surface of the central bore clampingly engages the shaft.

BRIEF DESCRIPTION OF THE DRAWINGS

FIG. 3 is a view along the bore axis of the shaft clamp shown in FIG. 1;

FIG. 4 is a side view of the shaft clamp shown in FIG. 3; and

DETAILED DESCRIPTION

Figure 1:
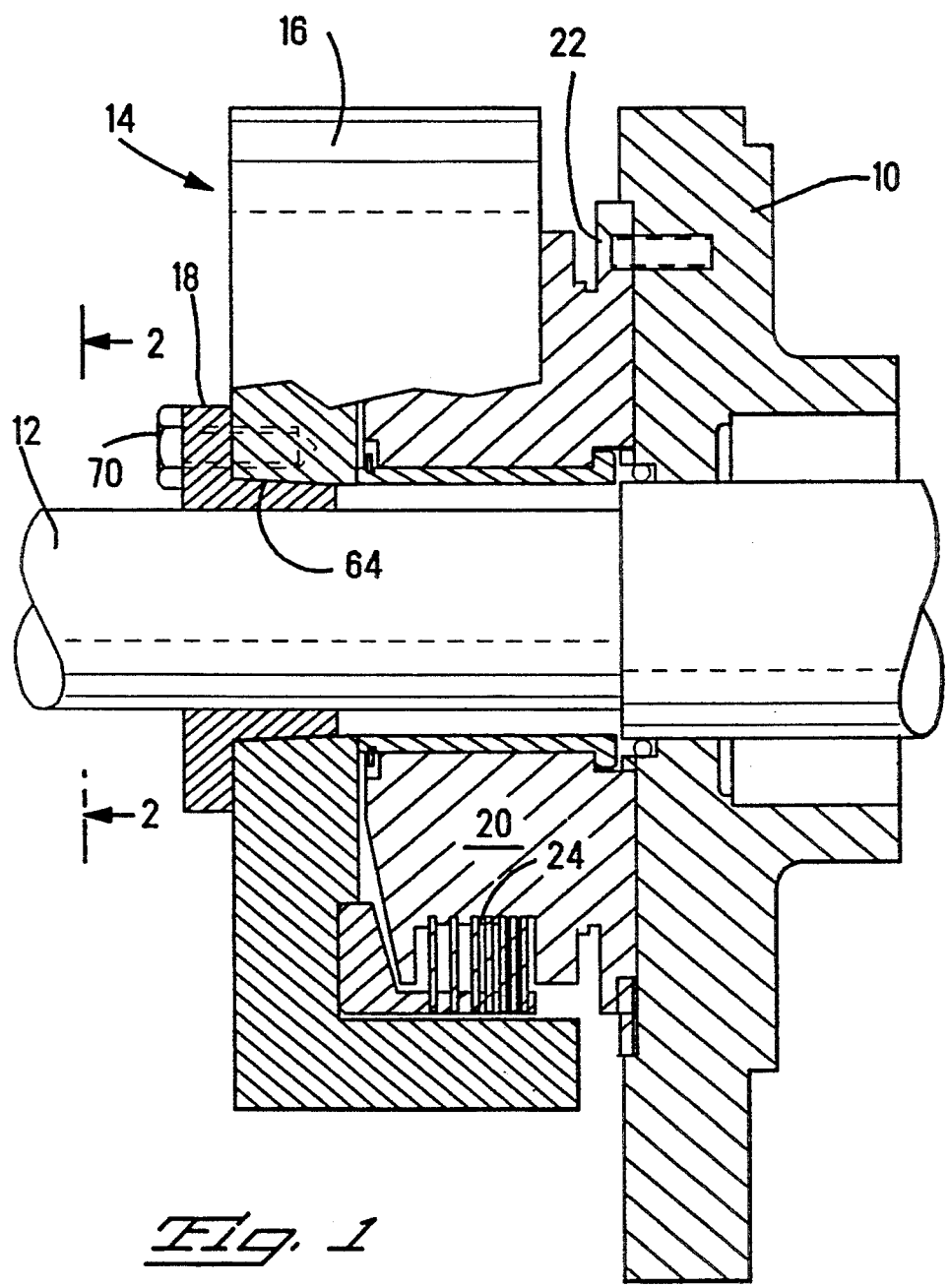
FIG. 1 is a partial cross-sectional view of a typical shaft and brake assembly utilizing the teachings of the present invention.
Figure 2:
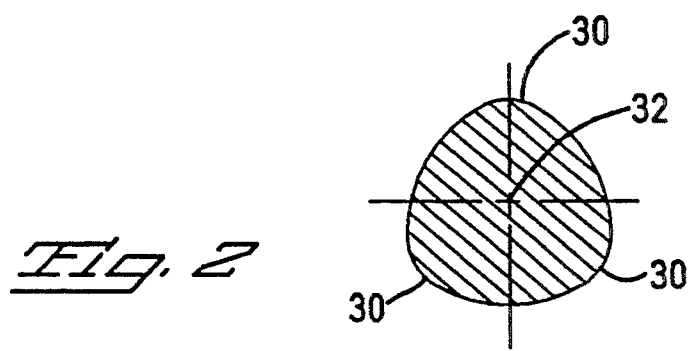
FIG. 2 is a cross-sectional view of the shaft taken along the lines 2—2 of FIG. 1.

There is shown in FIG. 1 a portion of a machine 10 having a shaft 12 journaled for rotation therein. A brake assembly 14 has a rotor 16 that is secured to the shaft 12 by means of a one piece shaft clamp 18 for rotation therewith, and a stator 20 that is fastened to the frame of the machine 10 by means of the screws 22. A series of disc brake pads 24 are coupled to the brake assembly 14 and engagable by means of an electromagnet, that is part of the stator 20, in the usual manner. As is best seen in FIG. 2, the shaft 12 has a cross-sectional shape including three equally spaced lobs 30 that are equidistant from the center of rotation 32 of the shaft. This is known in the industry as a three lobe polygon shaft and has advantages over common circular shafts in that torsional loads are distributed more evenly, partly because of the lack of a keyway and key structure that is inherent in a shaft of circular cross section. In the present example the three lobe polygon shaft has a major diameter of about 1.87 inches and a minor diameter of about 1.63 inches. These dimensions, however, may be varied to accommodate different applications. While a three lobe polygon shaft is utilized in the present example, the teachings of the present invention may be advantageously employed with shafts of many different cress-sectional shapes, including rectangular, square, irregular such as a spline shaft, polygonal, and even circular.

Figure 5:
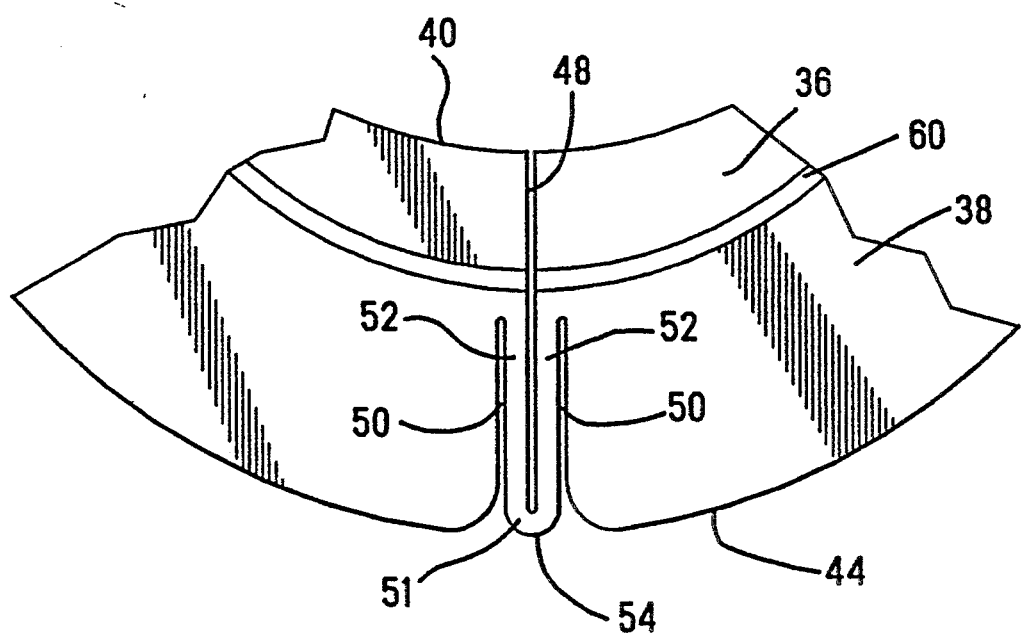
FIGS. 5 through 9 are partial views of alternative structures for the area enclosed in phantom lines in FIG. 3 and indicated by 4–8.

The shaft clamp 18, as best seen in FIGS. 3 and 4, has a shank 36 and a flange 38 formed integral therewith. A bore 40, having a longitudinal axis 42, extends completely through the shaft clamp 18 and is sized and shaped to very closely conform to the size and shape of the shaft 12 when the shaft clamp is in clamping engagement with the shaft. The periphery 44 of the flange 38, in the present example, is circular and concentric with the axis 42, however, it need not be. The clamp 18 is divided into three substantially similar segments 46 by three relatively thin cuts of slots 48 that extend completely through the shank 36 and into, but not through, the flange 38. The reason for this will become apparent. Each of the segments 46 is arranged so that it embraces one of the lobes 30 of the shaft 12 and the cuts 48 are in alignment with the relatively flattened areas between the lobes. This arrangement was found to provide substantially even clamping forces on the shaft 12. As best seen in FIGS. 3 and 5 a pair of relatively thin cuts or slots 50 are formed in the periphery 44 of the flange 38 and extend toward the shank 36, one cut on each side of the cut 48. These cuts 50 do not extend into the shank 36. The cuts 50, in combination with the cut 48, define a U-shaped beam 51 having two legs 52 joined at a bite 54 that is near the periphery 44. The width of the cuts 48 and 50 are about 0.012 inch and the thickness of each leg of the beam is about 0.125 inch, in the present example. However, the width of each leg 52 is the full width of the flange 38, about 0.44 inch. This allows the flange to flex a certain amount when the shaft clamp is engaged or disengaged yet keeps the segments in their proper alignment, as will be described below.

The shank 36 of the shaft clamp 18 has a tapered outer surface 60 that is frustum shaped with its smaller end 62 extending away from the flange 38. The rotor 16 includes a central bore 64 having a taper that mates with the tapered surface 60 so that when the shank 36 is forced into the tapered bore 64, the three segments 46 are urged to move toward the axis 42. Three through holes 66 are equally spaced about the flange 38, one hole in each segment 46, as shown in FIG. 3. Three corresponding threaded holes 68 are formed in the rotor 16 opposite the holes 66 for receiving three cap screws 70, as shown in FIG. 1.

In operation, the screws 70 are tightened evenly so that the flange 38 is pulled toward the rotor 16 and the shank 36 forced deeper into the tapered bore 64 thereby causing the three segments 46 to move toward and clampingly engage the shaft 12. As this occurs, the three U-shaped beams 51 deflect slightly allowing the three segments 46 to come closer together. During the tightening of the screws 70 the outer face 72, as shown in FIG. 4, remains substantially flat and perpendicular to the axis 42, as the three segments are held in alignment by the three relatively wide U-shaped beams 51. There are three threaded holes 74 formed in the flange 38, as shown in FIG. 3. When it is desired to remove the shaft clamp 18 from clamping engagement with the shaft 12, the screws 70 are removed and jack screws are threaded into the holes 74 and tightened against the face of the rotor 16 so that the flange 38 is pushed away from the rotor thereby causing the shank 36 to withdraw from the tapered bore 64 and release the shaft. As will be understood by those skilled in the art, this one piece shaft clamp is quite simple to operate effectively, where conversely, a similar clamp composed of three separate pieces would be cumbersome and difficult to maintain an even distribution of forces during the tightening of the screws 70.

In the present example, the surface 60 of the shank 36 has been described as being preferably frustum shaped, however, other shapes may be utilized that are tapered to a smaller dimension further away from the flange 38. For example, three equally spaced flat but tapered surfaces could be substituted for the frustum shaped surface 60 as long as the tapered bore 64 was similarly shaped and the flat surfaces are positioned parallel to a tangent to the lobes 30. It will be understood that such a variation will depend on the shape of the shaft 12 and should conform to the number and shape of the segments 46. The important requirement being that the shape of the portion of the bore 40 that is contained in the segment defines how it must engage the shaft 12 so that even clamping forces result, therefore, the tapered surface of the shank must result in a movement of the segment that satisfies that definition.

While the U-shaped beam 51 shown in FIGS. 3 and 5 is preferred, several variations that utilize the teachings of the present invention will become apparent to the skilled art worker upon reading the present disclosure. Some of these variations are shown in FIGS. 6 through 9 which show similar features having similar identifying numbers.

Figure 6:
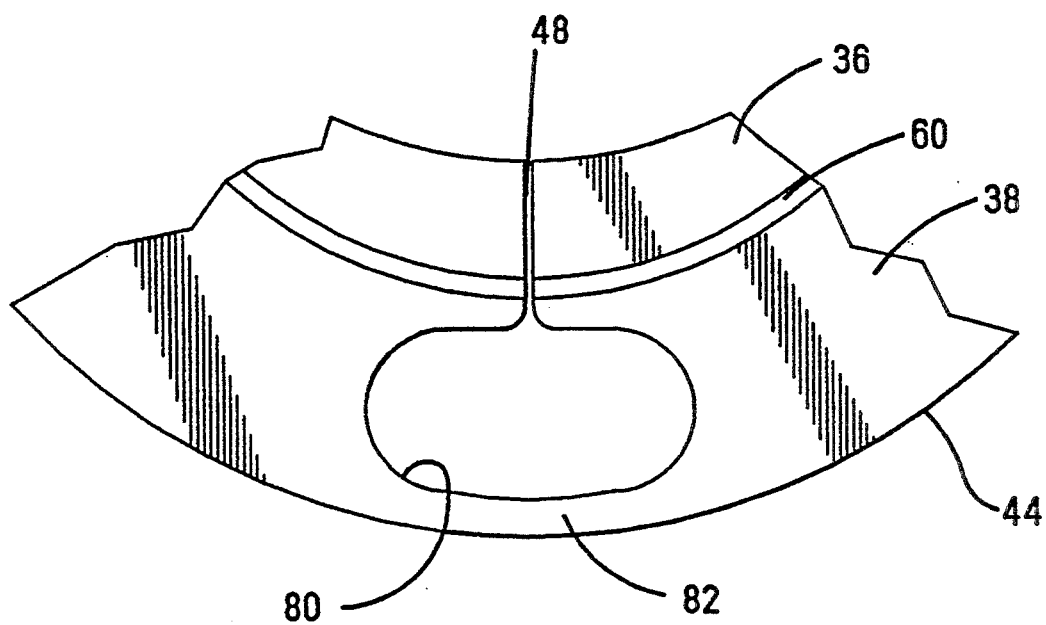
Figure 7:
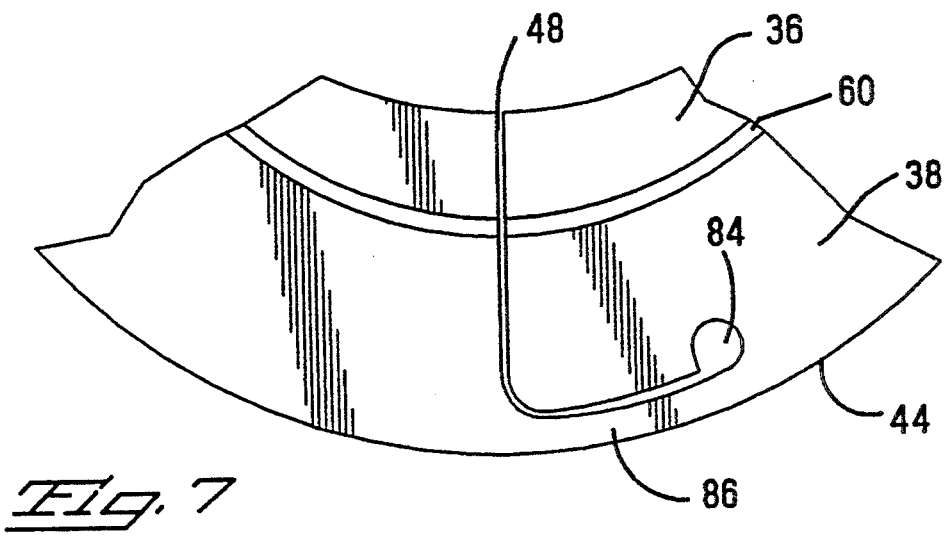
Figure 8:
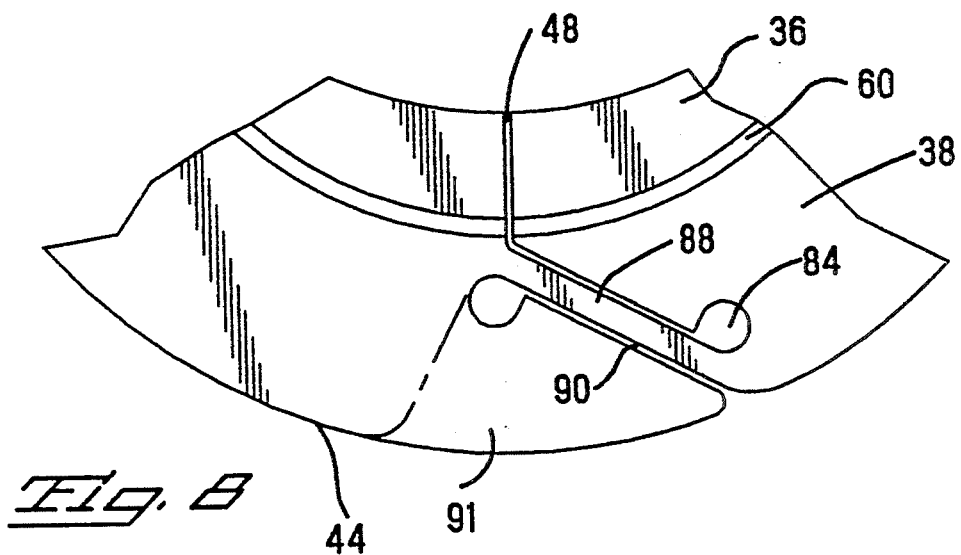
Figure 9:
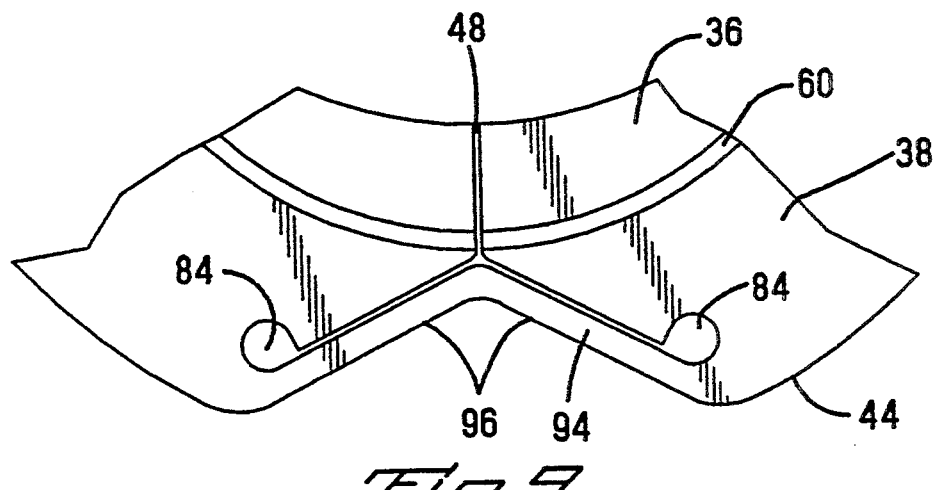

FIG. 6 shows a portion of a flange 38 where the cut 48 terminates in a relatively large hole 80 that is formed through the flange close to the periphery 44. The hole 80 and periphery 44 define a beam 82 that will deform slightly when the shank 36 is forced into the tapered bore 64 permitting the segments to move toward the axis 42 and clampingly engage the shaft 12. FIG. 7 shows the cut 48 extending deep into the flange to a point close to the periphery 44 where it continues to the left parallel with the curved surface of the periphery to a relatively small hole 84 thereby defining a beam 86. The structures shown in FIGS. 8 and 9 are similar to that shown in FIG. 7 except that the cut extends through the shank 36 and into the flange a short distance where it further extends on an angle toward the lower right and terminates in a hole 84 as shown. In the case of FIG. 8 a beam 88 is defined by another cut 90 that extends inwardly from the periphery 44 parallel with the angled portion of the cut 48 and terminating in a hole 92. A variation of this would be to extend a cut from the hole 92 through the periphery 44, as indicated by the phantom line, thereby completely removing the portion 91 of the flange. In the case of FIG. 9 a V-shaped beam 94 is defined by extending the cut 48 to both the right and left to form a Y-shaped slot as shown. Then, a notch 96 is cut in the periphery of the flange 38 close to the angled portions of the cut 48 to form the beam. In all cases shown in FIGS. 6 through 9 the beams 82, 86, 88, and 94 are thin enough to permit them to deform slightly when the shank 36 is forced into the tapered bore 64 permitting the segments to move toward the axis 42 and clampingly engage the shaft 12. The important requirement in all these cases is that a relatively thin beam be defined within the flange 38 that resiliently interconnects the segments 46, yet is strong enough, when considering the width of the flange 38, so that the segments remain in alignment while the screws 70 are tightened.

An important advantage of the present invention is that the shaft clamp 18 is of unitary construction while having resilient portions that allow the segments to move into clamping engagement with the shaft. Only one part need be stocked and handled by the user. Additionally, the structure of the beams, being relatively wide in the direction of the axis 42 provide stable alignment for the segments during installation to the shaft resulting in well distributed loadings on the shaft. Another important advantage is that the present shaft clamp may be easily and reliably utilized with shafts of non-circular cross section.

I claim:

1. A shaft clamp of unitary construction for securing a member to a shaft for rotation therewith having a shank, a flange, and a central bore formed along an axis, said bore substantially conforming to the outer circumference of the shaft in both size and shape, said shank having an outer surface that tapers from said flange and converges away therefrom, said flange having a peripheral surface and having a greater outer diameter than said shank's outer diameter, said shank being formed in at least two segments that are interconnected only by a resilient portion of said flange, said member having an inner surface that tapers in conformance to and mates with said tapered outer surface of said shank, including means for urging said two tapered surfaces into engagement so that the surface of said central bore clampingly engages said shaft.

2. The shaft clamp according to claim 1 wherein said two tapered surfaces are frustum shaped.

3. The shaft clamp according to claim 1 wherein said at least two segments are three substantially similar segments.

4. The shaft clamp according to claim 3 wherein said shaft has a three lobe polygon shaped cross section and said central bore of said clamp corresponds thereto.

5. The shaft clamp according to claim 1 wherein each of said portions interconnecting said segments comprises a beam, one end of which is integral with one said segment and the other end of which is integral with another said segment.

6. The shaft clamp according to claim 5 wherein said beam is U-shaped.

7. The shaft clamp according to claim 6 wherein the bite of said U-shaped beam is adjacent said peripheral surface of said flange.

8. A shaft clamp and member assembly for securing to a shaft for rotation therewith comprising:
   a shank having an outer tapered surface extending from a first end to a second end, said tapered surface converging toward said second end;
   a flange attached to said first end of said shank, said flange having a peripheral surface and having a greater outer diameter than said shank's outer diameter;
   a central bore through both said shank and said flange, a portion of said bore substantially conforming to the shape and size of said shaft;
   at least one first slot completely through said shank and through only a portion of said flange;
   a tapered bore in said member sized to mate with said outer surface of said shank; and
   means for urging said outer surface of said shank into engagement with said tapered bore so that the surface of said central bore clampingly engages said shaft thereby securing said shaft clamp and member assembly to said shaft.

9. The assembly according to claim 8 wherein one of said outer tapered surfaces of said shank and said tapered bore of said member is frustum shaped.

10. The assembly according to claim 8 including a second slot through said peripheral surface of said flange extending only partially into said flange adjacent said first slot thereby forming a beam interconnecting the two portions of said flange on either side of said first slot.

11. The assembly according to claim 10 including three of said first slots and three of said second slots, each being adjacent to a respective first slot, thereby forming three of said beams in said flange.

12. The assembly according to claim 11 wherein said shaft has a three lobe polygon shaped cross section and said central bore of said clamp corresponds thereto.

13. The shaft clamp according to claim 12 wherein each of said beams is U-shaped.

14. The shaft clamp according to claim 13 wherein the bind of each of said U-shaped beams is adjacent said peripheral surface of said flange.

* * * * *